US006186343B1

(12) United States Patent
Brown

(10) Patent No.: US 6,186,343 B1
(45) Date of Patent: Feb. 13, 2001

(54) ELEMENT FOR SUPPORTING OPTICAL DISKS OR OPTICAL DISK CONTAINERS IN A SUBSTANTIALLY VERTICAL POSITION

(75) Inventor: Julian Francis Brown, Bath (GB)

(73) Assignee: Rexite S.p.A. (IT)

( * ) Notice: Under 35 U.S.C. 154(b), the term of this patent shall be extended for 0 days.

(21) Appl. No.: 09/339,792

(22) Filed: Jun. 24, 1999

(30) Foreign Application Priority Data

Jan. 25, 1999 (IT) .............................. MI99U0040

(51) Int. Cl.[7] .............................. B65D 5/52; A47G 29/00
(52) U.S. Cl. ...................... 211/40; 206/45.23; 248/441.1
(58) Field of Search .................. 211/40, 41.12, 211/42, 49.1, 195; 248/447, 454, 441.1; 40/120, 124.2, 723; 206/736, 737, 45.2, 45.23, 387.12, 387.13, 425, 449

(56) References Cited

U.S. PATENT DOCUMENTS

| 1,169,869 | * | 2/1916 | Richards | 211/42 |
|---|---|---|---|---|
| 1,830,815 | * | 11/1931 | Twait | 248/441.1 |
| 2,117,667 | * | 5/1938 | Johnson | 248/441.1 |
| 2,527,161 | * | 10/1950 | Tyll | 206/45.23 |
| 2,669,058 | * | 2/1954 | Fadeley, Jr. | 248/441.1 X |
| 2,720,985 | * | 10/1955 | Jauch | 211/42 |
| 2,807,369 | * | 9/1957 | Stark | 248/441.1 X |
| 3,913,711 | * | 10/1975 | Schmid | 206/45.23 |
| 4,105,112 | * | 8/1978 | Graf | 40/317 |
| 4,289,235 | * | 9/1981 | Egly | 206/45.15 |
| 4,397,387 | * | 8/1983 | Bidegain | 206/45.23 |
| 4,424,899 | * | 1/1984 | Rosenberg | 206/45.23 |
| 4,545,898 | * | 10/1985 | Ekuan | 206/444 |
| 4,546,948 | * | 10/1985 | Ferrara | 248/454 |
| 4,575,037 | * | 3/1986 | Hammar | 248/441.1 |
| 4,615,445 | * | 10/1986 | Stocchiero | 206/45.23 |
| 4,634,001 | * | 1/1987 | Wakelin | 206/45.23 |
| 4,708,239 | * | 11/1987 | Bourbon | 206/45.13 |
| 4,750,611 | * | 6/1988 | Morrone | 206/45.13 |
| 5,078,159 | * | 1/1992 | Yuhara | 206/45.23 |
| 5,474,710 | * | 12/1995 | Erickson | 211/40 |
| 5,706,955 | * | 1/1998 | Anderson | 211/40 |
| 5,871,094 | * | 2/1999 | Leibowitz | 206/45.23 |

* cited by examiner

Primary Examiner—Daniel P. Stodola
Assistant Examiner—Jennifer E. Novosad
(74) Attorney, Agent, or Firm—Steinberg & Raskin, P.C.

(57) ABSTRACT

A support element for optical disks, compact disks (CDs) or containers therefor which is able to maintain the disks or containers in a substantially vertical position. The support element includes a casing which includes a first part and a second part, the second part being hingedly connected to the first part such that the first and second parts each have a free end. The casing is structured and arranged to have a first closed position in which the first and second parts are mutually superposed and a second open position in which the free end of the first part is angularly displaced from the free end of the second part in a first direction such that the first and second parts are able to support the disks or their containers in a substantially vertical position.

3 Claims, 2 Drawing Sheets

ELEMENT FOR SUPPORTING OPTICAL DISKS OR OPTICAL DISK CONTAINERS IN A SUBSTANTIALLY VERTICAL POSITION

FIELD OF THE INVENTION

This invention relates to a support element for optical disks or CDs or for their containers in accordance with the introduction to the main claim.

BACKGROUND OF THE INVENTION

Numerous members, devices or elements are known for supporting and containing optical disks and/or their containers. For example, so-called towers are known comprising a plurality of superposed shelves connected to lateral supports and having dimensions substantially equal to those of the CD containers, each shelf being able to support a corresponding container.

Such support elements are of considerable size, are often difficult to position in a room, are often of unstable equilibrium and are frequently unsuitable for positioning on a worktop, on a desk or on any CD player support.

OBJECTS AND SUMMARY OF THE INVENTION

An object of the invention is to provide a support element for optical disks or CDs and/or for their containers which is easy to use, can be accommodated on any worktop or support for the CD player, and when not in use is substantially the same size as a CD container.

A further object is to provide a support element of the aforesaid type which is of low weight and is considerably reliable and safe when in use.

These and further objects which will be apparent to the expert of the art are attained by a support element in accordance with the accompanying claims.

BRIEF DESCRIPTION OF THE DRAWINGS

The invention will be more apparent from the accompanying drawing, which is provided by way of non-limiting example and on which.

DETAILED DESCRIPTION OF THE PREFERRED EMBODIMENT

Figure 1:
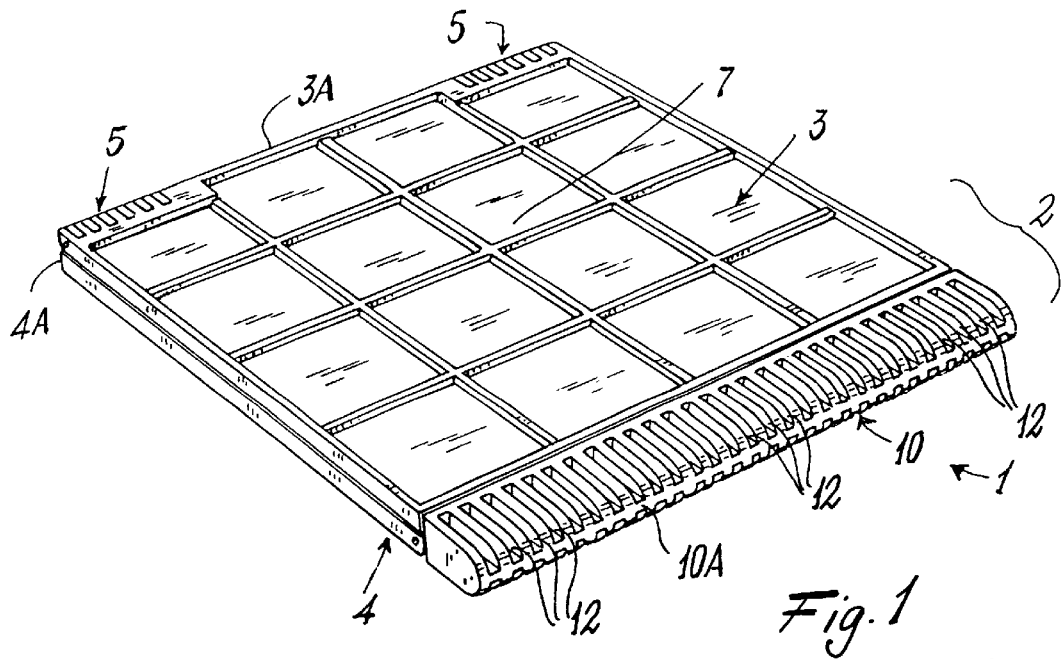
FIG. 1 is a perspective view of the support element in its closed position.

With reference to said figures, a support element for CDs or optical disks and/or for their containers is indicated overall by 1 and comprises a casing 2. This has two main parts or portions 3 and 4, hinged together at 5 along their first ends (or end surfaces) 3A and 4A. Each of these portions comprises two opposite surfaces 6 and 7, a first (6) preferably smooth and the other (7) ribbed or otherwise stiffened. The surfaces 6 and 7 are preferably full, however they can alternatively be open, defined by elements mutually interlaced in the manner of a mesh or defined by parallel elements connected together by a peripheral frame defining the sides or edges 8 of each portion.

Hinged at 9 to the second end 4B of the second portion 4 there is a resting member 10. This latter can rotate (arrow F of FIG. 3) about the hinge 9 in a direction (for example clockwise with reference to FIG. 3) opposite to the direction of rotation (for example anti-clockwise, arrow W of FIG. 3) of the first portion 3 about the hinge 5. When rotated, this member becomes positioned with one side 103 (the engagement surface) resting against the surface 7 (the other surface) of the portion 4, so enabling this latter to be kept inclined to and incident to the plane P on which the support element 1 rests. In this manner, the first portion 3, positioned (when raised or open from the portion 4) at 90° to the second, lies at an angle α to said plane which is other than 90°.

Advantageously, one or more projections 22 extend from the side 10B of the member to cooperate, when the member 10 is rotated, with corresponding recesses 23 provided in the surface 7 of the second portion 4. This enables the member 10 to be reliably maintained in the position shown in FIGS. 3 and 4, to hence maintain the portion 4 inclined.

At least one similar projection 27 extends from the portion 3 to cooperate with a seat 28 provided in the portion 4, in order to ensure that the portion 3 remains raised from the portion 4.

The resting member 10 has an outer surface 10A knurled or provided with a plurality of recesses 12 to facilitate its gripping by the user.

Figure 2:
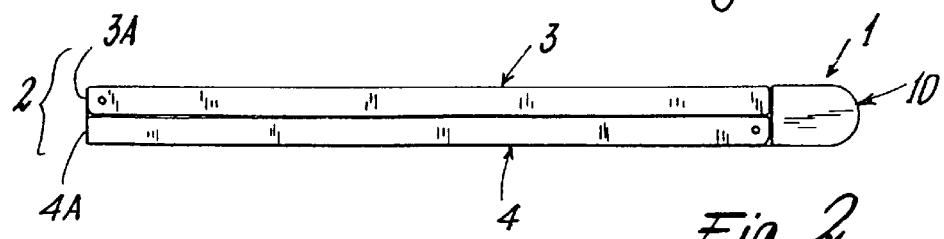
FIG. 2 is a side view of the element of FIG. 1.

When the casing 2 is closed, as shown in FIGS. 1 and 2, the outer surface 10A of the resting member 10 lies on the end 4B of the portion 4 and on the corresponding end 3B of the portion 3 which, together with the portion 4, is then substantially coplanar with the member 10. In this case (first working position), the portion 3 rests on the portion 4, and the casing 2 can be used as a support for example for stacked CD containers. As the dimensions of each part or portion 3 and 4 are substantially equal to those of a CD container, the casing 2 securely supports each container superposed on it.

Figure 3:
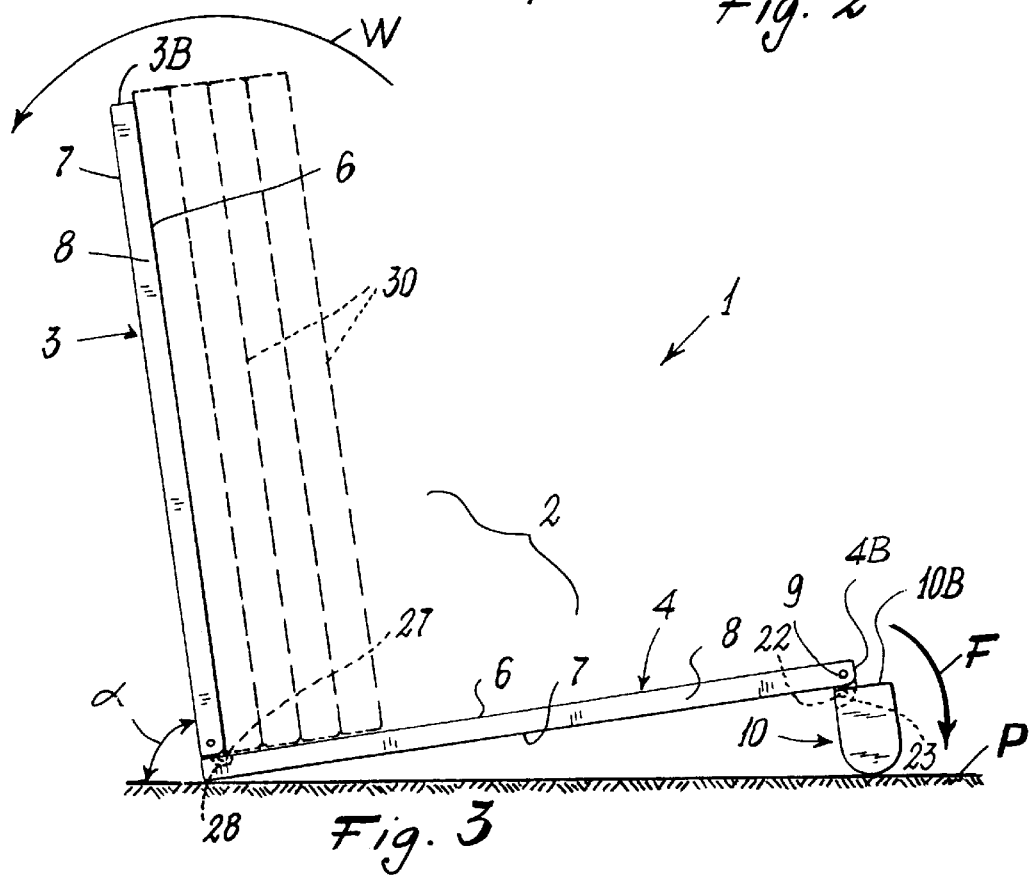
FIG. 3 is a side view of the support element in its open position.
Figure 4:
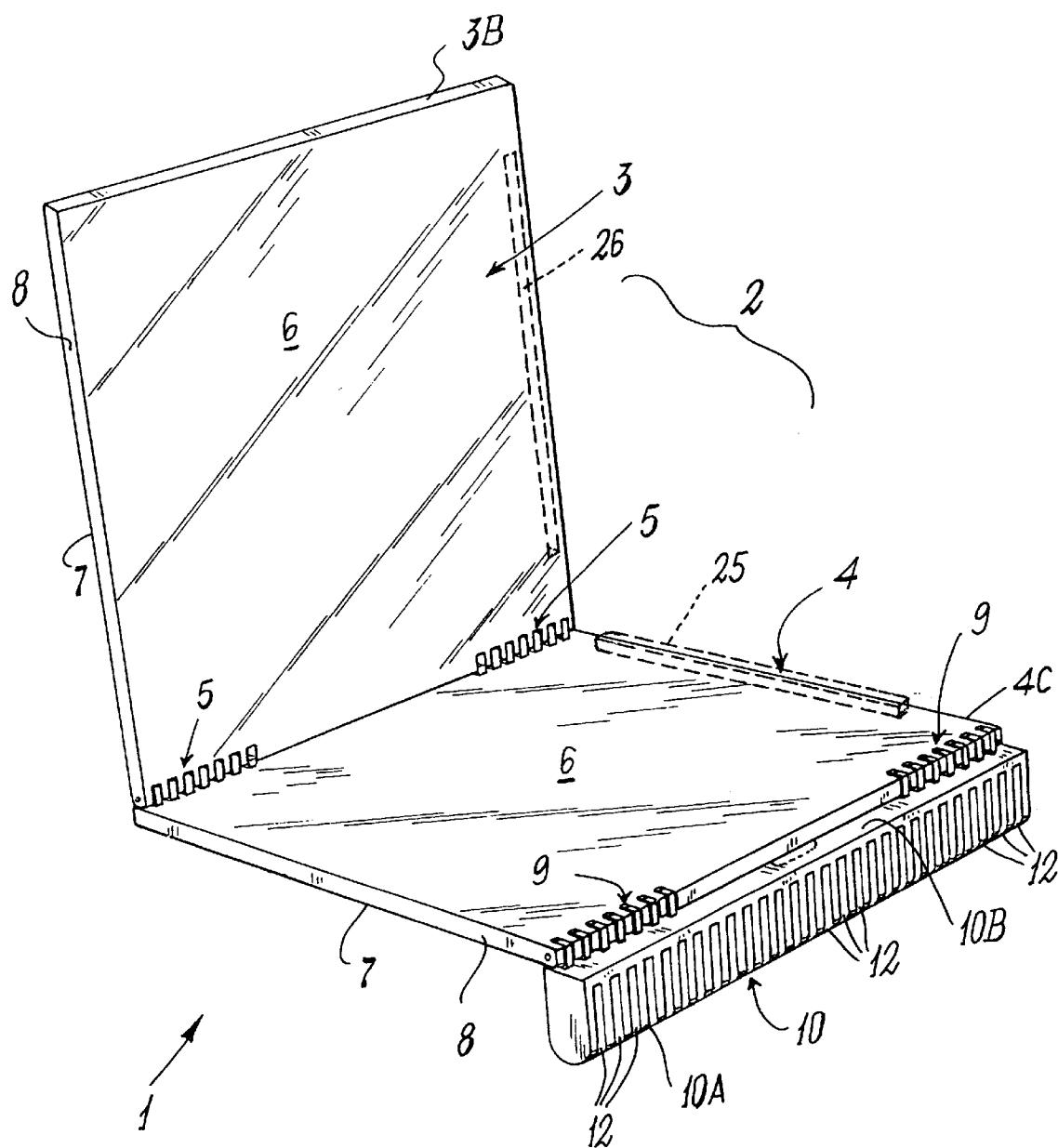
FIG. 4 is a perspective view of the support element of FIG. 3.

If the casing 2 is arranged in its open position as in FIG. 3, a plurality of CD or optical disk containers 30 can be securely held vertically on its portion 4, resting against the portion 3. This facilitates their gripping.

Advantageously, along a side 4C of the portion 4 perpendicular to the portion 3 there can be provided, on the surface 6, a thin shoulder 25 against which the optical disks or their containers 30 can rest when positioned on the portion 4. In the same way, in the variant under examination the surface 6 of the portion 3 can comprise a recess 26 of dimensions such as to receive the shoulder when the casing is closed.

The described support element is simple to construct and easy to use. Embodiments other than that described can however be provided. For example, the casing 2 could comprise only the two portions 3 and 4 and the portion 4 could comprise one or more retractable resting feet associated with its edge 4B or with the surface 7. Again, the portion 4 could have no associated resting member, and instead the ends 3A and 4A of the portions 3 and 4 could be formed as inclined planes so that when these ends are superposed (ie when the casing 2 is in its open position), the portion 3 is maintained in a plane which is inclined to the portion 4. These variants are to be considered as falling within scope of the present document.

What is claimed is:

1. A support element for optical disks, compact disks (CDs) or containers therefor which is able to maintain the disks or containers in a substantially vertical position, comprising:

a casing, the casing including a first part and a second part having an outer surface, the second part being hingedly connected to the first part such that the first and second parts each have a free end having an end surface, the casing having a first closed position in which the first and second parts are mutually superposed and a second open position in which the free end of the first part is angularly displaced from the free end of the second part in a first direction such that the first and second parts are able to support the disks or their containers in a substantially vertical position;

at least one resting member having an engagement surface, the resting member being hingedly connected to the free end of the second part of the casing and structured and arranged to be rotatable in a second direction opposite from the first direction such that the resting member supports the second part; and wherein when the casing is in the first closed position, the engagement surface of the resting member rests against the end surfaces of the first and second parts such that the first and second parts are coplanar with the resting member and, when the casing is in the second open position, at least a portion of the engagement surface of the resting member rests against the outer surface of the second part.

2. A support element as claimed in claim 1, characterised in that from the resting member there extends at least one projection (22) arranged to cooperate with a corresponding seat (23) provided in said second part (4).

3. A support element as claimed in claim 1, characterised in that each of the first and second parts (3, 4) comprises two opposite surfaces (6, 7), one (7) of the surfaces being ribbed.

* * * * *